United States Patent [19]

Norvell

[11] Patent Number: 5,155,867
[45] Date of Patent: Oct. 20, 1992

[54] PROTECTIVE UNDERGARMENT

[75] Inventor: Jean Norvell, Newark, Del.

[73] Assignee: W. L. Gore & Associates, Inc., Newark, Del.

[21] Appl. No.: 704,767

[22] Filed: May 23, 1991

[51] Int. Cl.⁵ .............................................. A41B 9/06
[52] U.S. Cl. ............................................. 2/113; 2/82; 2/114; 2/243 A; 2/DIG. 7; 428/198; 428/212
[58] Field of Search ................. 2/113, 82, 114, 243 A, 2/DIG. 7; 428/198, 212

[56] References Cited

U.S. PATENT DOCUMENTS

| | | | |
|---|---|---|---|
| 3,916,447 | 11/1975 | Thompson | 2/243 A |
| 4,194,041 | 3/1980 | Gore et al. | 2/82 |
| 4,196,245 | 4/1980 | Kitson et al. | 428/198 |
| 4,344,999 | 8/1982 | Gohlke | 428/212 |
| 4,443,511 | 4/1984 | Worden et al. | 428/198 |
| 4,736,467 | 4/1988 | Schwarze et al. | 2/114 |
| 4,868,928 | 9/1989 | Norvell | 2/272 |
| 5,027,438 | 7/1991 | Schwarze et al. | 2/114 |

Primary Examiner—Werner H. Schroeder
Assistant Examiner—Gloria Hale
Attorney, Agent, or Firm—Gary A. Samuels

[57] ABSTRACT

A stretchable water penetration resistant moisture-vapor permeable undergarment that protects the body from accidental contact with blood and other body fluids. The underwear provides protection to medical personnel working in non-standard environments such as emergency rooms, accident and natural disaster sites, rescure operations and the like.

2 Claims, 2 Drawing Sheets

PROTECTIVE UNDERGARMENT

FIELD OF THE INVENTION

This invention relates generally to garments for protection against accidental contact by blood and other body fluids, in particular to protective undergarments, and to a method for making them.

BACKGROUND OF THE INVENTION

Special clothing and accessories for prevention of contact by blood and other body fluids has long been recognized as necessary in medical environments to protect the health of workers and patients alike. To this end many special protective garments in the form of suits, gown, drapes, masks, gloves, etc., have been developed and routinely used in hospital and clinic operating rooms, recovery rooms, isolation wards and other like areas.

These areas are typically activity-specific, i.e., they are entered for the purpose of performing specific tasks, for example, surgery, delivery of babies, dressing burn wounds, etc., and are generally not exited until the tasks are completed. The areas also, generally, provide stable conditioned environments in which to do the work. The work itself, although requiring great skill, care, and concentration is usually fairly stationary.

The special medical protective garments currently available are designed and constructed for use in the activities and under conditions described above. They are, typically, outerwear worn over standard work uniforms or street clothing, and are discarded by the wearer after each use for laundering or disposal.

Currently available medical protective garments are not intended, nor are they suited, for use in situations involving changing or hostile work environments, long periods of strenuous activity or exertion requiring full-range limb mobility by the wearer, high risk of damage, contamination, or heavy soiling to outerwear, and in which frequent exchange of protective outerwear is impractical. Such situations are routinely encountered by a large group of medical workers including emergency room personnel, emergency response personnel, paramedics, and the like.

SUMMARY OF THE INVENTION

The present invention provides a stretchable, body conformable undergarment material is impermeable to blood and other body fluids. The material is water penetration resistant and has high moisture vapor transmission characteristics. It also has good hand and feel when worn against the skin in order to maximize comfort during long wear periods. It can comprise an undershirt, underpants, one-piece body suit or the like.

The undergarment material is a stretchable laminated material comprising a composite outer layer of a porous hydrophobic polymer which has been coated with a hydrophilic polymer; and a second stretchable inner backing layer which is a knit textile fabric, such as a knit cotton fabric.

The material is patterned, cut and fashioned into undergarments by conventional means, for example, by sewing or other bonding methods, following which the seams are sealed to ensure impermeability to blood and other body fluids.

Specifically, the invention provides a garment for underwear comprising a body tight article of clothing that is made of stretchable water penetration resistant, water-vapor permeable membrane laminated to a backing material, said backing material located on the interior side of the article.

DESCRIPTION OF THE PREFERRED EMBODIMENTS

With reference to the drawings the article of the invention will be described in detail.

Figure 1:
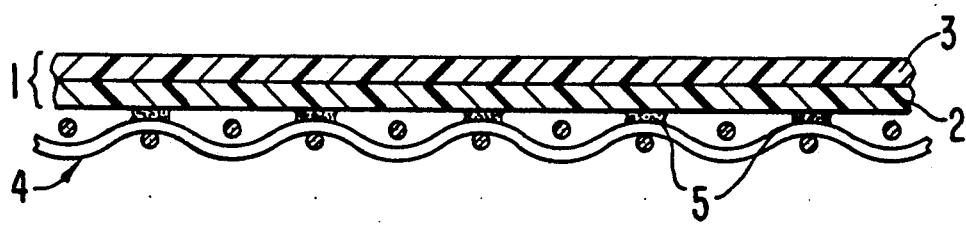
FIG. 1 is a cross-section of the layered material used in the invention.

Referring to FIG. 1, the composite outer layer 1 is made up of a layer of porous hydrophobic polymer 2, i.e. a water penetration resistant, water-vapor permeable polymer, preferably the porous expanded polytetrafluoroethylene membrane described in U.S. Pat. Nos. 3,953,566, 3,962,153, 4,096,227, and 4,187,390, coated with a hydrophilic layer 3 of a polyurethane as described in U.S. Pat. Nos. 4,194,041 and 4,942,214. This combination of layers 2 and 3 is stretchable. The stretchable layer is then bonded to a layer 4 of a stretchable knit textile fabric, preferably of cotton or polyester-cotton blend, with an adhesive 5.

The adhesive 5 may be selected from many known in the art. Suitable adhesives may be found in, but not limited to, the classes consisting of thermoplastics, thermosets, or reaction curing polymers. The adhesives may be applied to the surfaces to be laminated by conventional means, for example, by coating or printing methods.

Figure 2:
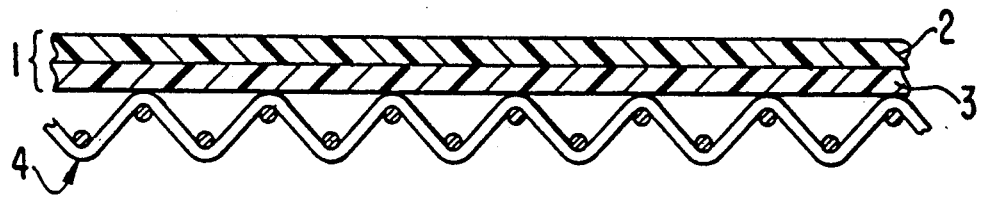
FIG. 2 is a cross-section of an alternative arrangement of the layers forming the composite layer.

An alternative embodiment of the composite outer layer 1 is shown in FIG. 2. For cost, convenience, or process considerations it may be desirable to bond the composite outer layer 1 to the fabric layer 4 using the hydrophilic polyurethane layer 3 of the composite layer 1 as the adhesive. In this instance, the positioning of the components forming the composite outer layer shown in FIG. 1 are reversed with respect to their relationship to the fabric layer 4. There is no loss in the protective function of the material by so doing.

Figure 3:
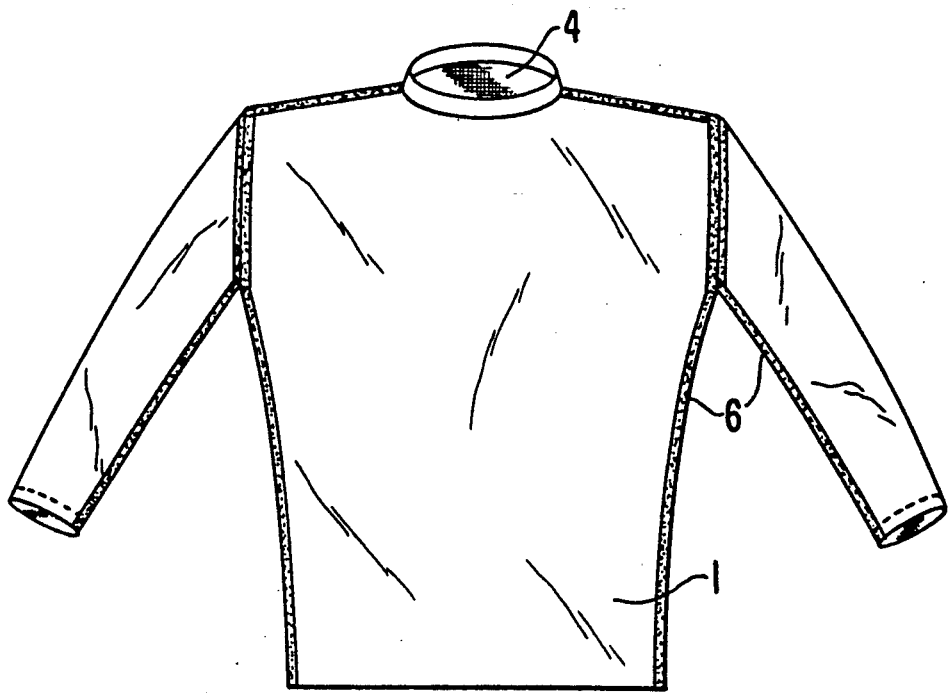
FIG. 3 shows the material of the invention in the form of an undershirt.

The combination of layer 2 and 3 in the outer layer 1 of either embodiment of the invention provide protection to the body from contact with liquid water, blood, and other body fluids which may be presented to the material regardless of their orientation with respect to each other. Further, such arrangement of layers precludes staining by such liquids and fluids. FIG. 3 depicts an article of clothing made from the material of FIGS. 1 and 2. The material has been patterned, cut and joined in the form of an undershirt. Joining is typically done by sewing although other methods, for example, adhesive joining, can be used. The fabric layer 4 forms the inside surface of the article and the outer surface of the article is formed by the composite layer 1. The seams at which the material is joined and the perforations int he material created by sewing are sealed by application of seam sealing tape 6 to preserve the protective integrity of the article.

Although many materials and methods to seal seams and perforations are known in the art, use of tapes comprised of thermoplastic polyurethanes, or other suitable thermoplastic polymers, which fully cover the means and perforations are preferred for the launderability, durability, and strength they impart.

Figure 4:
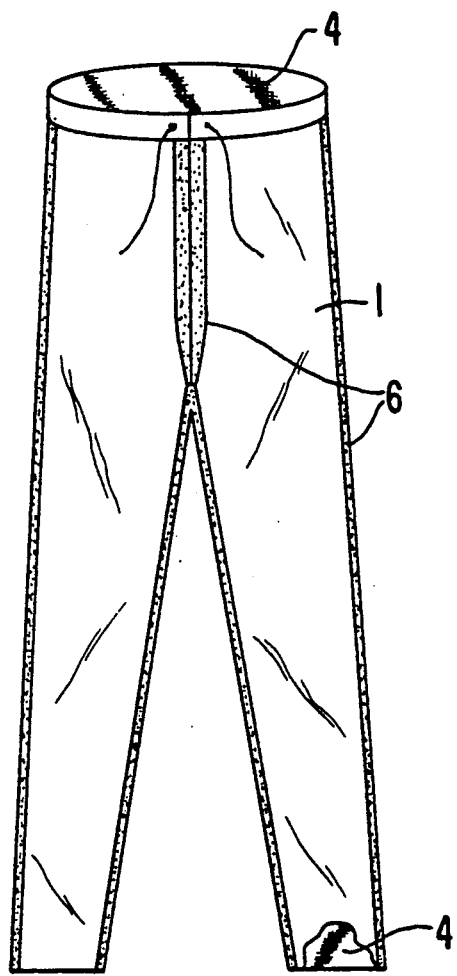
FIG. 4 shows the material of the invention in the form of underpants.

FIG. 4 depicts a second embodiment of the invention in which the protective undergarment materials are sewn together in the form of underpants. As in FIG. 3, the composite layer 1 forms the outer surface of the article, the fabric layer 4 forms the inner surface, and the seams and perforations are sealed by the application of seam sealing tape 6.

It is understood that the above-depicted forms of the invention are not mean to be limiting and that other forms and designs of protective undergarments, for example, body suits and the like, are included in the scope of the invention.

The forms and materials of the invention must meet important comfort criteria to be suitable for use as undergarments. Knit fabrics of cotton and polyester-cotton blends are widely used in the manufacture of undergarments and are known for their pleasant feel and their ability to conform comfortably to the body without inhibiting motion. Cotton, a natural staple fiber, is also known for its ability to absorb moisture in large amounts, approximately equivalent to its own weight, thus increasing comfort by removing perspiration from the skin. For these reasons, as well as cost and availability considerations, cotton and polyester-cotton blends are preferred as the material for the fabric layer 4 although other material with similar properties can be used effectively.

A further comfort requirement of the materials of the invention is the ability to provide high moisture vapor transmission rates (MVTR). It has been shown that perceived comfort has a positive correlation with moisture vapor permeability of materials. By providing a means to aid evaporation of perspiration through transmission of its vapor the human body is assisted in regulating the temperature and comfort is increased. The materials of the invention must have MVTR greater than 5,000, preferably greater than 10,000, more preferably greater than 13,000 grams/square meter/day as measured by the test procedure described in U.S. Pat. No. 4,862,730, "Test Method for Determination of Moisture Vapor Transmission Rate."

It is thus seen that the invention provides an undergarment that provides the wearer protection from accidental contact with blood and other body fluids while affording the wearer the opportunity to put on or remove outerwear and accessories without loss or protection to accommodate changing work situations and environments.

I claim:

1. A stretchable, body conformable, undergarment for the protection of the wearer from contact with external fluids, comprised of a stretchable laminated material of
   a) a stretchable water penetration-resistant, moisture vapor-permeable membrane,
   b) a hydrophilic polyurethane layer adhered to said membrane, and
   c) a stretchable knit textile fabric adhered to said hydrophilic polyurethane, wherein the undergarment is constructed such that the knit textile fabric is on the inside of the undergarment.

2. The undergarment of claim 1 wherein the stretchable water penetration resistant, moisture vapor-permeable membrane comprises porous, expanded polytetrafluoroethylene.

* * * * *